US012725558B2

(12) United States Patent
Darmon et al.

(10) Patent No.: US 12,725,558 B2
(45) Date of Patent: Sep. 1, 2026

(54) STATIC IMAGE FRAME EFFICIENT REFRESH SYSTEMS AND METHODS

(71) Applicant: Apple Inc., Cupertino, CA (US)

(72) Inventors: Denis M Darmon, Boulder, CO (US); Christopher P Tann, San Jose, CA (US); Hopil Bae, Palo Alto, CA (US); Yanghyo Kim, Cupertino, CA (US); Ramana V Rachakonda, Austin, TX (US); Xiaofeng Wang, San Jose, CA (US); Robert D Zucker, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/353,584

(22) Filed: Jul. 17, 2023

(65) Prior Publication Data

US 2024/0096263 A1 Mar. 21, 2024

Related U.S. Application Data

(60) Provisional application No. 63/376,503, filed on Sep. 21, 2022.

(51) Int. Cl.
*G09G 3/20* (2006.01)
*G02B 26/08* (2006.01)

(52) U.S. Cl.
CPC ....... *G09G 3/2096* (2013.01); *G02B 26/0833* (2013.01); *G09G 2320/0626* (2013.01); *G09G 2330/021* (2013.01); *G09G 2360/18* (2013.01)

(58) Field of Classification Search
CPC ...... G09G 5/399; G09G 5/006; G09G 3/2096; G09G 3/346; G09G 3/2022; G09G 2340/0435; G09G 2320/0626; G09G 2370/00; G09G 2330/021; G09G 2360/18; G02B 26/0833
See application file for complete search history.

(56) References Cited

U.S. PATENT DOCUMENTS

2002/0118144 A1* 8/2002 Edmonds ............... G09G 5/006 345/1.1
2003/0016201 A1* 1/2003 Ayres .................. G09G 3/3291 345/98
2008/0158641 A1* 7/2008 Lieb ..................... G09G 3/3426 359/263
2011/0148948 A1* 6/2011 Gandhi ................ G02B 26/001 345/84
2012/0146968 A1 6/2012 Glen
(Continued)

*Primary Examiner* — Yaron Cohen
(74) *Attorney, Agent, or Firm* — Fletcher Yoder, P.C.

(57) ABSTRACT

A device may include image processing circuitry that generates image data corresponding to an image to be displayed during a first image frame and a second image frame. However, the image data is not regenerated for the second image frame. The device may also include an electronic display having a frame buffer that receives and stores the image data from the image processing circuitry. The electronic display may also include a display panel that displays the image during the first image frame based on a first read of the image data from the frame buffer in response to a first emission sync signal and displays the image during the second image frame based on a second read of the image data from the frame buffer in response to a second emission sync signal.

20 Claims, 11 Drawing Sheets

(56) References Cited

U.S. PATENT DOCUMENTS

| | | | | |
|---|---|---|---|---|
| 2014/0240268 | A1* | 8/2014 | den Boer ............ | G09G 3/3648<br>345/173 |
| 2016/0372077 | A1 | 12/2016 | Koo et al. | |
| 2021/0118393 | A1 | 4/2021 | Kwa et al. | |
| 2022/0101809 | A1 | 3/2022 | Ansari et al. | |

* cited by examiner 30
14
12
32
14
36
16
16
10
10B 30
32
12
14
34
36
10
16
16
14
10A 28
38 IMAGE DATA SOURCE
48 SOURCE IMAGE DATA
IMAGE PROCESSING CIRCUITRY
50 IMAGE DATA PROCESSING BLOCK(S)
52 DISPLAY IMAGE DATA
54
42 CONTROLLER
44 PROCESSOR
46 MEMORY
56 EMISSION SYNC SIGNAL
58
12
60 FRAME BUFFER
37 DISPLAY CONTROLLER
40 DISPLAY PANEL

FIG. 6

STATIC IMAGE FRAME EFFICIENT REFRESH SYSTEMS AND METHODS

CROSS-REFERENCE TO RELATED APPLICATIONS

This application claims priority to U.S. Provisional Application No. 63/376,503, filed on Sep. 21, 2022, and entitled "Static Image Frame Efficient Refresh Systems and Methods," the contents of which is hereby incorporated by reference in its entirety.

SUMMARY

The present disclosure generally relates to efficiently refreshing a static image frame on an electronic display.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In some embodiments, image processing circuitry generates display image data (e.g., bitplanes) and supplies the display image data via an image datalink to an electronic display. Moreover, the image processing circuitry and/or a controller thereof supplies an emission sync signal to the electronic display (e.g., via a separate datalink, such as a command bus) to control/set the timing of light emissions from the display panel of the electronic display. The display image data may be received at the electronic display and stored in a frame buffer, and the emission sync signal may instigate a read of the frame buffer to display the display image data on the display panel.

In general, image frames may be sequentially displayed at a refresh rate (e.g., based on the emission sync signal), and each image frame may be the same or different from the previous image frame. For example, different image frames shown in succession may appear as a moving picture or as scene changes to a viewer. However, in some scenarios, it may be desirable to display the same image frame repeatedly, such as for static content. In some embodiments, the repeated content may be generated as second, third, and so on sets of display image data for as long as the image is static, and the corresponding display image data may be sent to the electronic display (e.g., via the image datalink) for displaying each repeated image frame according to the emission sync signal. Additionally or alternatively, an auto-refresh command may be sent to the electronic display (e.g., via the command bus), for example in place of the emission sync signal, to place the electronic display into an auto-refresh mode to maintain the same image frame. However, utilizing the image processing circuitry and image datalink consumes power and/or other resources (e.g., processing bandwidth), and implementing the auto-refresh mode (e.g., without the emission sync signal) may be disruptive to timings and/or require additional circuitry or programming that may consume power and/or other resources (e.g., processing bandwidth).

BRIEF DESCRIPTION OF THE DRAWINGS

Various aspects of this disclosure may be better understood upon reading the following detailed description and upon reference to the drawings described below.

FIG. 6 is a block diagram of the image processing circuitry of FIG. 1 coupled to the electronic display of FIG. 1, in accordance with an embodiment;

DETAILED DESCRIPTION

Figure 1:
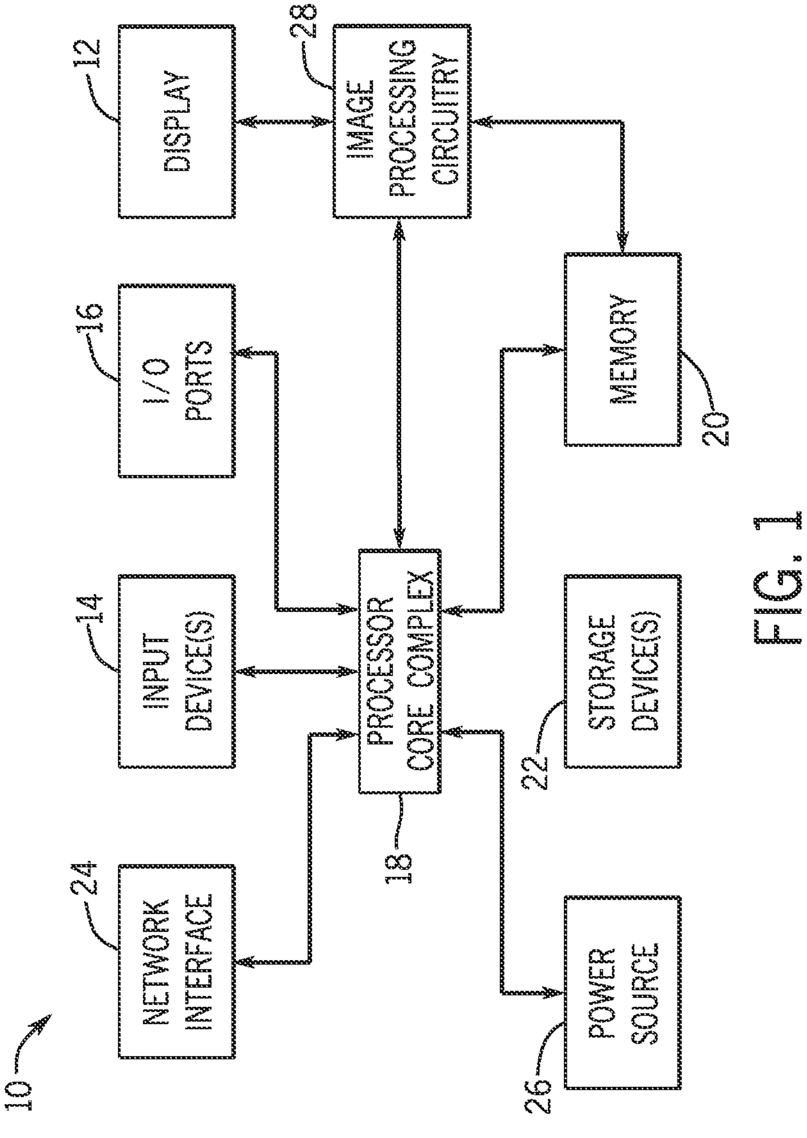
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the brightness and color of the light emitted from viewable pixel locations based on corresponding image data. For example, an image data source may provide image data as a stream of pixel data, in which data for each pixel location indicates a target luminance (e.g., brightness and/or color) for that pixel locations. Some electronic displays utilize display pixels at the pixel locations to modulate the amount of light emitted directly (e.g., by adjusting an amount of light generated by a self-emissive pixel) or indirectly (e.g., by adjusting a transmissivity of the display pixel). Moreover, reflective technology displays may include illuminators (e.g., backlights or projectors) that generate light for several different pixels and one or more mirrors that selectively direct a portion of the generated light to be emitted at the pixel locations based on luminance values of the image data corresponding to the pixel locations.

In general, self-emissive displays, such as light emitting diode (LED) displays (e.g., micro-LED displays) and organic LED (OLED) displays generate light at pixel locations according to image data. Furthermore, transmissive displays may generally utilize one or more illuminators (e.g., backlights, projectors, etc.) such as LEDs, OLEDs, projector lamps, etc. with transmissivity regulating elements (e.g., liquid crystal pixels) at the pixel locations that modulate an amount of light and/or color of light that is emitted therefrom based on the image data. Moreover, reflective technology displays (e.g., digital micro-mirror device (DMDs), ferroelectric-liquid-crystal-on-silicon (FLCOS) display, etc.) may utilize illuminators and a set of mirrors to direct light to viewable pixel positions according to the image data. For example, the mirrors may direct light either to the pixel locations, effectively turning the pixel "on," or to one or more light attenuators, effectively turning "off" the pixel, according to the image data. In some embodiments, an image frame may be divided into multiple sub-frames such that the pixels of the electronic display (e.g., self-emissive display, transmissive display, or reflective technology display) alternate between on states and off states such that, in the aggregate, the amount of time that the pixel location is emitting the light (e.g., relative to the length of the image frame) is proportional to the desired luminance output at the pixel location according to the image data. While discussed below in the context of reflective technology displays, as should be appreciated, the techniques discussed herein may be applicable to any suitable type of display such as self-emissive displays and transmissive displays, as discussed above.

In some scenarios, the image data may be in the form of a set of bitplanes that set the arrangement of mirrors of a reflective technology display to control the light to the pixel locations. Each bitplane may be indicative of a set of mirror activations based on the image data. For example, a bitplane may set a portion of the mirrors to reflect light generated by the illuminator to a respective portion of pixel locations, and set other mirrors, associated with other pixel locations, to reflect the light to the light attenuator(s). As such, the bitplane may designate certain pixel locations as "on" and other pixel locations as "off". During an image frame, multiple bitplanes for each color component may be implemented such that, in the aggregate, the relative on/off time for each pixel location is indicative of the image data for each color component and thus the image. As should be appreciated, the human eye may temporally average the light emissions to perceive the image over the image frame. As used herein, a bitplane may be any set of data that designates mirror positions for each of the mirrors. Furthermore, in the context of non-reflective technology displays, the bitplanes may be indicative of image data for subframes of an image frame.

In some embodiments, image processing circuitry may generate display image data (e.g., bitplanes) and supply the display image data via an image datalink (e.g., high-speed datalink) to the electronic display. Moreover, the image processing circuitry and/or a controller thereof may supply an emission sync signal to the electronic display (e.g., via the same image datalink or a separate datalink such as a command bus) to control/set the timing of light emissions (e.g., corresponding to image frames) from the display panel of the electronic display. In some embodiments, the emission sync signal may be utilized to synchronize multiple operations of the electronic device and one or more electronic displays. In general, the display image data may be received at the electronic display and stored in a frame buffer, and the emission sync signal may instigate, directly or indirectly (e.g., via a set or programmable delay), a read of the frame buffer to display the display image data (e.g., one or more bitplanes) on the display panel. As should be appreciated, the frame buffer may store a set of bitplanes associated with an image frame or the frame buffer may store luminance values for each pixel position and a display controller may generate the set of bitplanes based thereon.

In general, image frames may be sequentially displayed at a refresh rate (e.g., based on the emission sync signal), and each image frame may be the same or different from the previous image frame. For example, different image frames shown in succession may appear as a moving picture to a viewer. However, in some scenarios, it may be desirable to display the same image frame repeatedly, such as for static content. In some embodiments, the repeated content may be generated as second, third, and so on sets of display image data for as long as the image is static, and the corresponding display image data may be sent to the electronic display (e.g., via the image datalink) for displaying each repeated image frame according to the emission sync signal. Additionally or alternatively, an auto-refresh command may be sent to the electronic display (e.g., via the command bus or other datalink), for example in place of the emission sync signal, to place the electronic display into an auto-refresh mode to maintain the same image frame. However, utilizing the image processing circuitry and image datalink consumes power and/or other resources (e.g., processing bandwidth), and implementing the auto-refresh mode (e.g., without the emission sync signal) may be disruptive to timings and/or require additional circuitry or programming that may consume power and/or other resources (e.g., processing bandwidth).

As such, in some embodiments, the image processing circuitry or a portion thereof may be shut down or placed into a low power mode and the emission sync signal may be supplied to the electronic display to instigate reads of the frame buffer without having updated the display image data sent thereto. For example, when the emission sync signal is received by the electronic display, the display controller may instigate a read of the frame buffer and display the display image data (e.g., set of bitplanes) as if the image frame was a new image frame. In effect, the electronic display may be tricked into displaying the same display image data from the frame buffer as if new display image data was received, which may maintain proper timing (e.g., frame scheduling, emission timing, etc.) according to the emission sync signal, while the image processing circuitry or a portion thereof is shutdown or maintained in a low power state, thus saving power and/or other resources (e.g., processing bandwidth).

With the foregoing in mind, FIG. 1 is an example electronic device 10 with an electronic display 12 having independently controlled color component illuminators (e.g., projectors, backlights, etc.). As will be described in more detail below, the electronic device 10 may be any suitable electronic device, such as a handheld electronic device, a tablet electronic device, a notebook computer, smart glasses, and the like. Thus, it should be noted that FIG. 1 is merely one example of a particular implementation and is intended to illustrate the types of components that may be present in the electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Additionally, the image processing circuitry 28 (e.g., a graphics processing unit, a display image processing pipeline, etc.) may be included in the processor core complex 18.

The processor core complex 18 may be operably coupled with local memory 20 and the main memory storage device 22. The local memory 20 and/or the main memory storage device 22 may include tangible, non-transitory, computer-readable media that store instructions executable by the processor core complex 18 and/or data to be processed by the processor core complex 18. For example, the local memory 20 may include cache memory or random access memory (RAM) and the main memory storage device 22 may include read only memory (ROM), rewritable non-volatile memory such as flash memory, hard drives, optical discs, and/or the like.

The processor core complex 18 may execute instructions stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

The network interface 24 may connect the electronic device 10 to a personal area network (PAN), such as a Bluetooth network, a local area network (LAN), such as an 802.11x Wi-Fi network, and/or a wide area network (WAN), such as a 4G, LTE, or 5G cellular network. In this manner, the network interface 24 may enable the electronic device 10 to transmit image data to a network and/or receive image data from the network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance of the sub-pixels based at least in part on corresponding image data. In some embodiments, the image data may be received from another electronic device, for example, via the network interface 24 and/or the I/O ports 16. Additionally or alternatively, the image data may be generated by the processor core complex 18 and/or the image processing circuitry 28. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
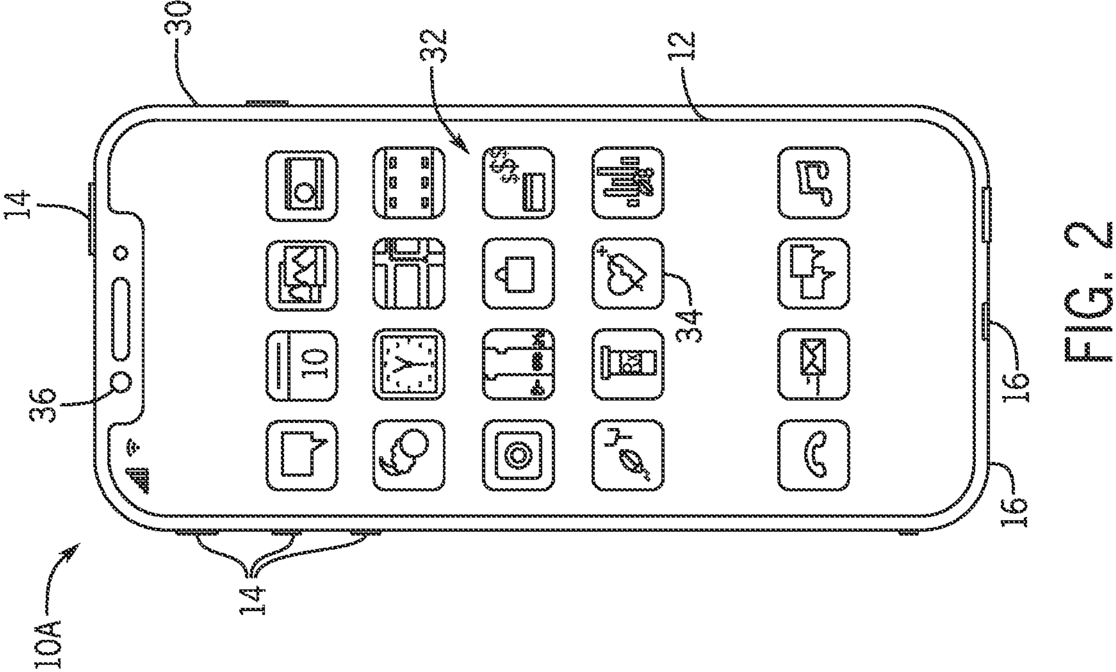
FIG. 2 is a front view of a mobile phone representing an example of the electronic device of FIG. 1, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as an iPhone® model available from Apple Inc.

The handheld device 10A may include an enclosure 30 (e.g., housing) to, for example, protect interior components from physical damage and/or shield them from electromagnetic interference. Additionally, the enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Furthermore, input devices 14 may be provided through openings in the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
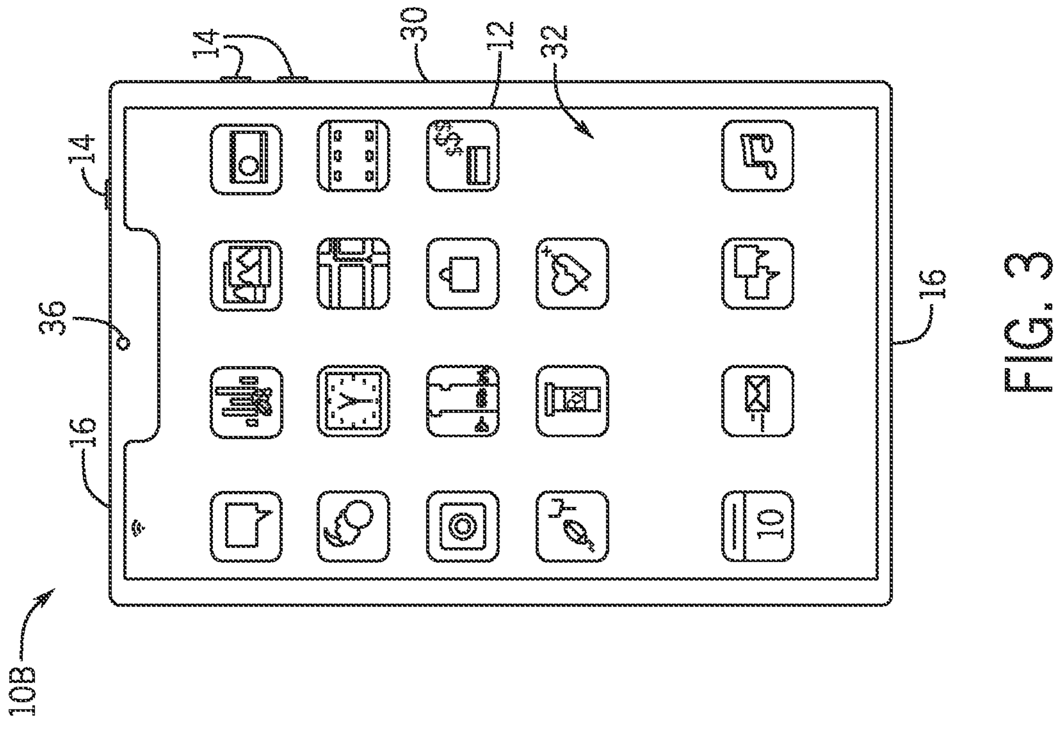
FIG. 3 is a front view of a tablet device representing an example of the electronic device of FIG. 1, in accordance with an embodiment.
Figure 4:
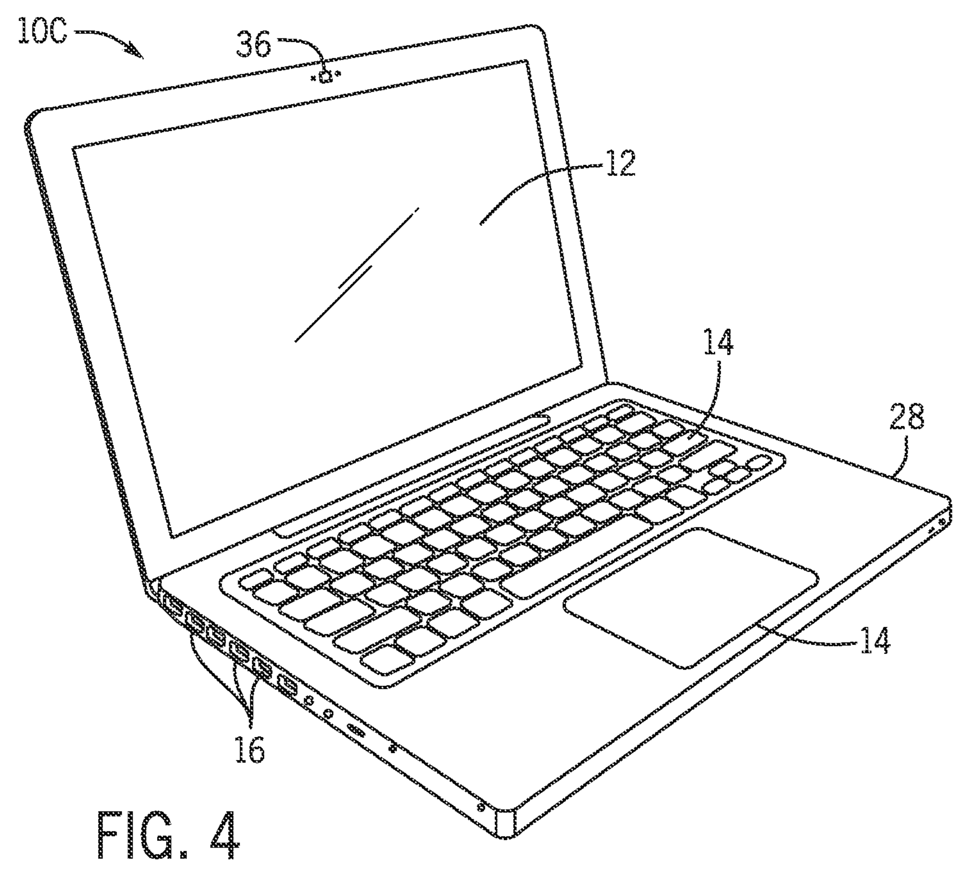
FIG. 4 is a front view of a notebook computer representing an example of the electronic device of FIG. 1, in accordance with an embodiment.
Figure 5:
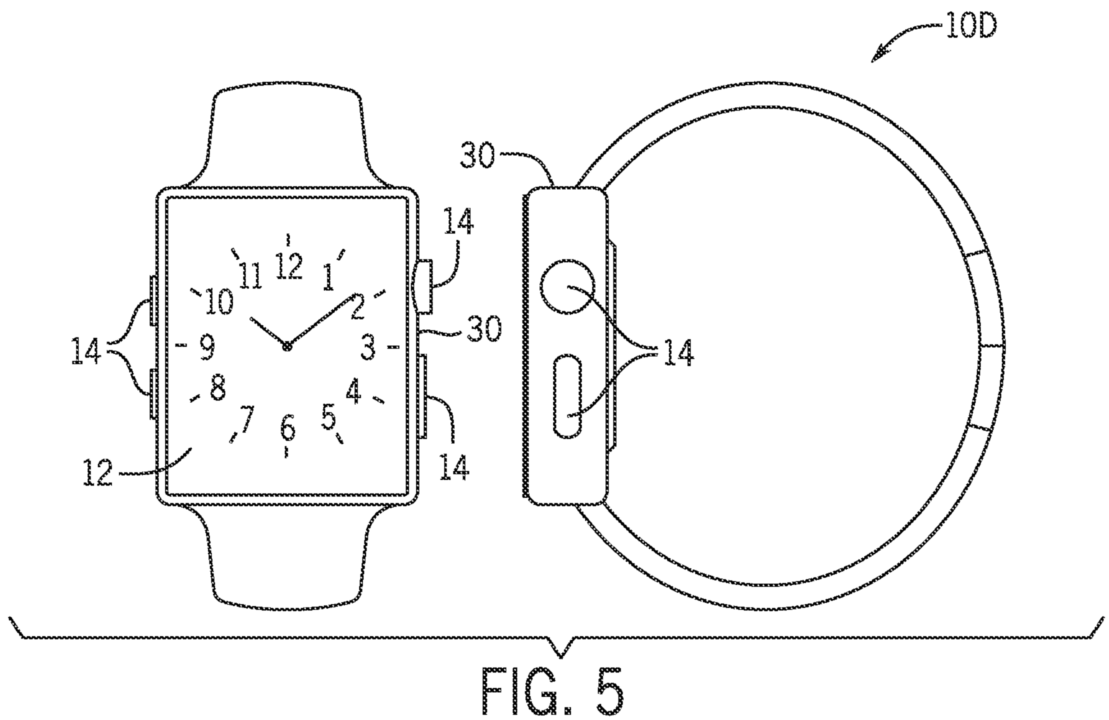
FIG. 5 are front and side views of a watch representing an example of the electronic device of FIG. 1, in accordance with an embodiment.

Another example of a suitable electronic device 10, specifically a tablet device 10B, is shown in FIG. 3. For illustrative purposes, the tablet device 10B may be an iPad® model available from Apple Inc. A further example of a suitable electronic device 10, specifically a computer 10C, is shown in FIG. 4. For illustrative purposes, the computer 10C may be a MacBook® or iMac® model available from Apple Inc. Another example of a suitable electronic device 10, specifically a watch 10D, is shown in FIG. 5. For illustrative purposes, the watch 10D may be an Apple Watch® model available from Apple Inc. As depicted, the tablet device 10B, the computer 10C, and the watch 10D each also includes an electronic display 12, input devices 14, I/O ports 16, and an enclosure 30.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 6:
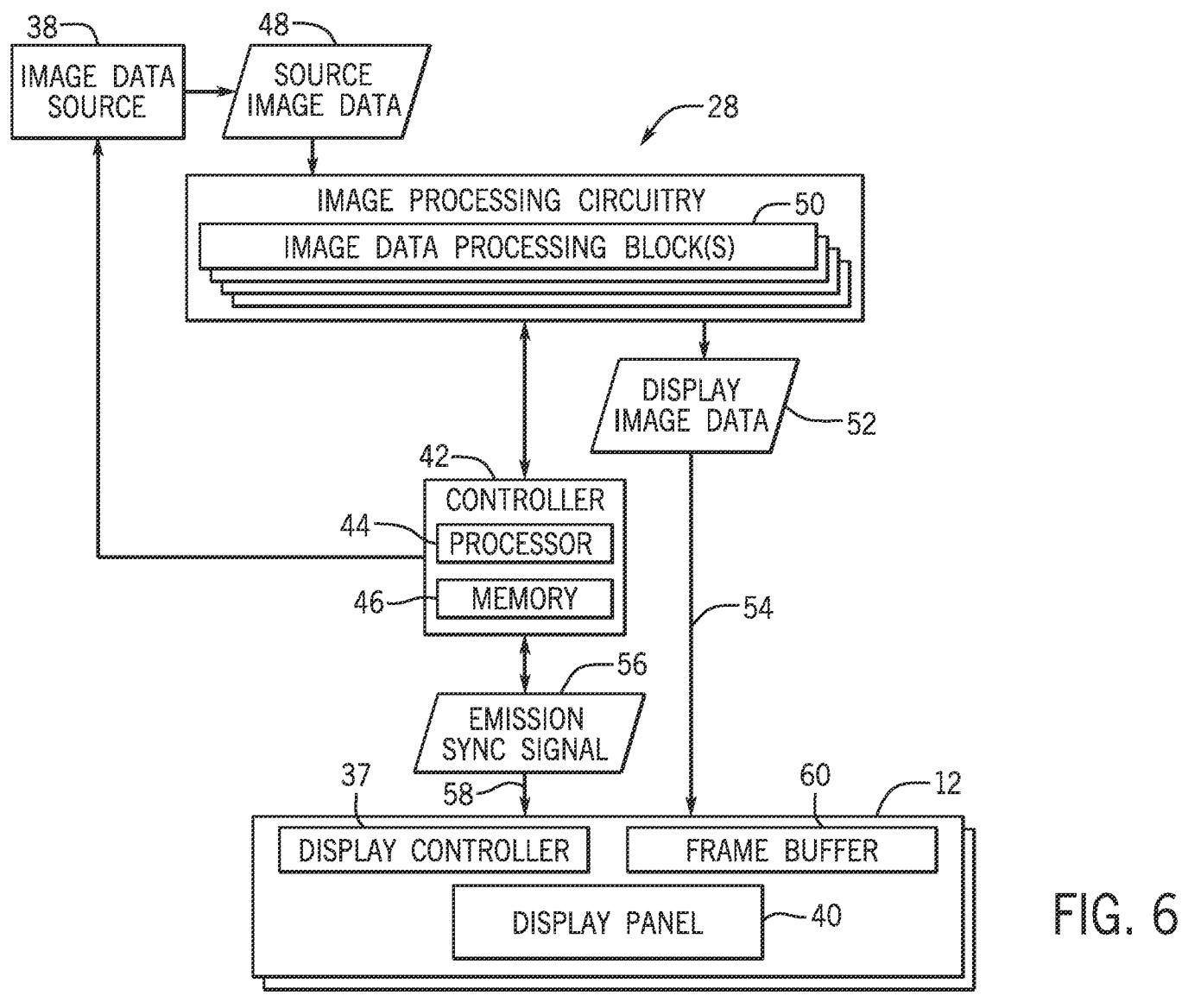

To help illustrate, a portion of the electronic device 10, including image processing circuitry 28 and an electronic display 12, is shown in FIG. 6. The image processing circuitry 28 may be implemented in the electronic device 10, in the electronic display 12, or a combination thereof. For example, the image processing circuitry 28 may be included in the processor core complex 18, a display controller 37 (e.g., a timing controller (TCON) or other control circuitry) of the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, one or more display panel 40 of one or more electronic display 12, and/or a controller 42 in communication with the image processing circuitry 28 and/or electronic display(s) 12. In some embodiments, the display panel 40 of the electronic display 12 may be a reflective technology display, a liquid crystal display (LCD), an LED display, or any other suitable type of display panel 40. In some embodiments, the controller 42 may control operation of the image processing circuitry 28, the image data source 38, and/or the electronic display 12. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue), the sub-pixels themselves, and/or pixel locations for emitting light indicative of an image.

As described herein, the image processing circuitry 28 may operate to process source image data 48 received from the image data source 38. The image data source 38 may include captured images from cameras 36, images stored in memory, graphics generated by the processor core complex 18, or a combination thereof. Additionally, the image processing circuitry 28 may include one or more image data processing blocks 50 (e.g., circuitry, modules, or processing stages). As should be appreciated, multiple image data processing blocks 50 may also be incorporated into the image processing circuitry 28, such as a color management block, a dither block, a pixel aging compensation block, a pixel contrast control block, a scaling/rotation block, etc. The image data processing blocks 50 may receive and process source image data 48 and output display image data 52 in a format (e.g., digital format and/or resolution) interpretable by the electronic display 12. For example, the display image data 52 may be in the form of bitplanes, as discussed further below. Furthermore, the functions (e.g., operations) performed by the image processing circuitry 28 may be divided between various image data processing blocks 50, and, while the term "block" is used herein, there may or may not be a logical or physical separation between the image data processing blocks 50.

In some embodiments, the image processing circuitry 28 may generate the display image data 52 (e.g., a set of luminance values or bitplanes) and supply the display image data 52 via an image datalink 54 (e.g., high-speed datalink) to the electronic display 12. Moreover, the image processing circuitry 28 and/or a controller 42 thereof may supply an emission sync signal 56 to the electronic display 12 via a command bus 58. In some embodiments, the command bus 58 may be a relatively low-speed datalink compared to the image datalink 54. Moreover, in some embodiments, the command bus 58 may be implemented as a portion of or separate from the image datalink 54. The emission sync signal 56 controls or otherwise sets the timing of light emissions (e.g., corresponding to image frames) from the display panel 40. For example, the emission sync signal 56 may be cyclical in accordance with a refresh rate of the display panel 40 and/or a frame rate of the image frames of display image data 52.

In general, the display image data 52 may be received at the electronic display 12 and stored in a frame buffer 60. In some embodiments, the emission sync signal 56 may instigate, directly or indirectly (e.g., via a set or programmable delay), a read of the frame buffer 60 to implement a set of display image data 52 stored therein on the display panel 40. As should be appreciated, the frame buffer 60 may store a set of bitplanes associated with an image frame or the frame buffer 60 may store luminance values for each pixel position and the display controller 37 may generate the set of bitplanes based thereon. As should be appreciated, the display controller 37 may include one or more separate processors and memory, dedicated circuitry, and/or be implemented in whole or in part in the controller 42 of the image processing circuitry 28. Regardless, as discussed above, the frame buffer 60 may be read to supply the display image data 52 that designates the light emissions and/or the regulation thereof from the display panel 40.

As discussed herein, an electronic display 12 may utilize one or more illuminators (e.g., backlights, projectors, self-emissive pixels, etc.) such as light LEDs (e.g., micro-LEDs), OLEDs, projector lamps, etc. to generate light for emission at pixel locations of the display panel 40. Some electronic displays 12 utilize display pixels at the pixel locations to modulate the amount of light emitted directly (e.g., by adjusting an amount of light generated by a self-emissive pixel) or indirectly (e.g., by adjusting a transmissivity of the display pixel) such as with a liquid crystal pixel. Moreover, reflective technology displays (e.g., digital micro-mirror displays (DMDs), ferroelectric-liquid-crystal-on-silicon (FLCOS) display, etc.) may include illuminators (e.g., backlights or projectors) that generate light for several different pixels and mirrors that selectively direct a portion of the generated light to pixel locations to be emitted based on the display image data 52 corresponding to the pixel locations.

Figure 7:
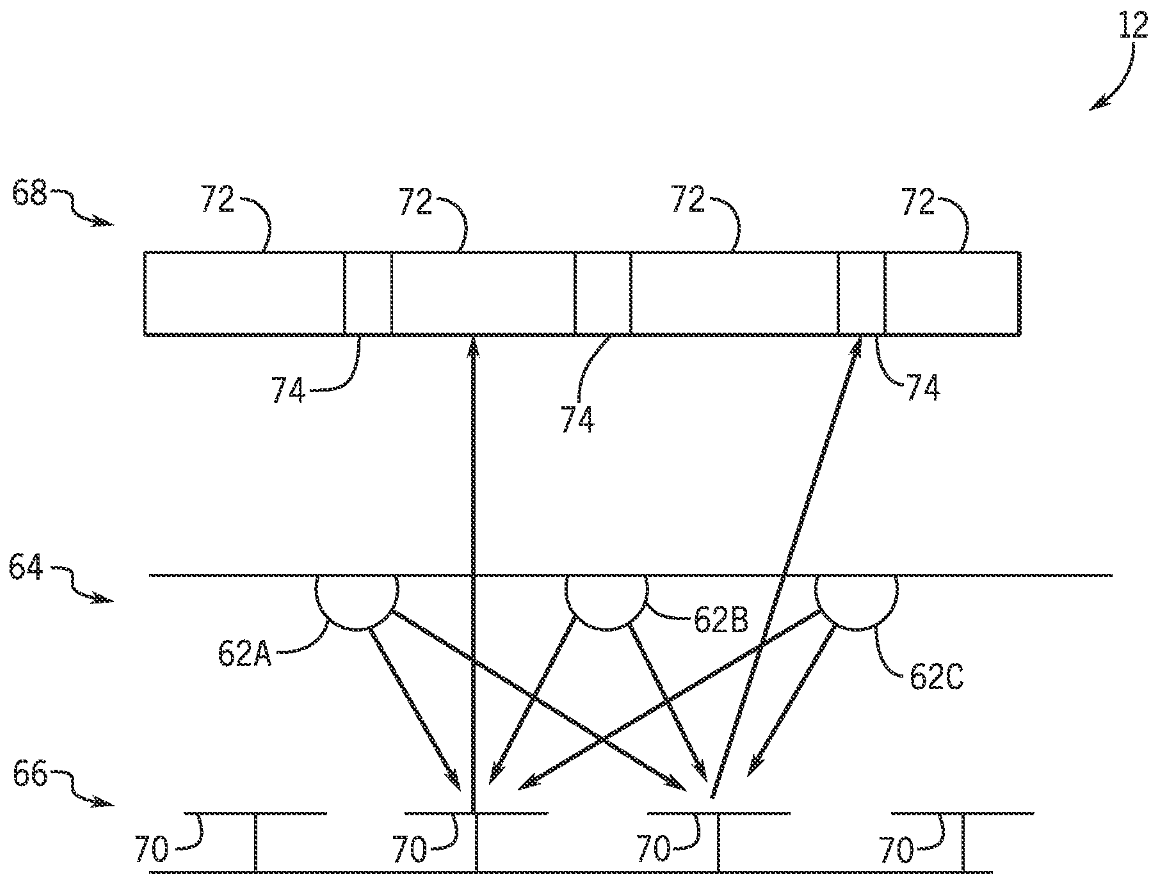
FIG. 7 is a schematic view of an example electronic display, in accordance with an embodiment.
Figure 8:
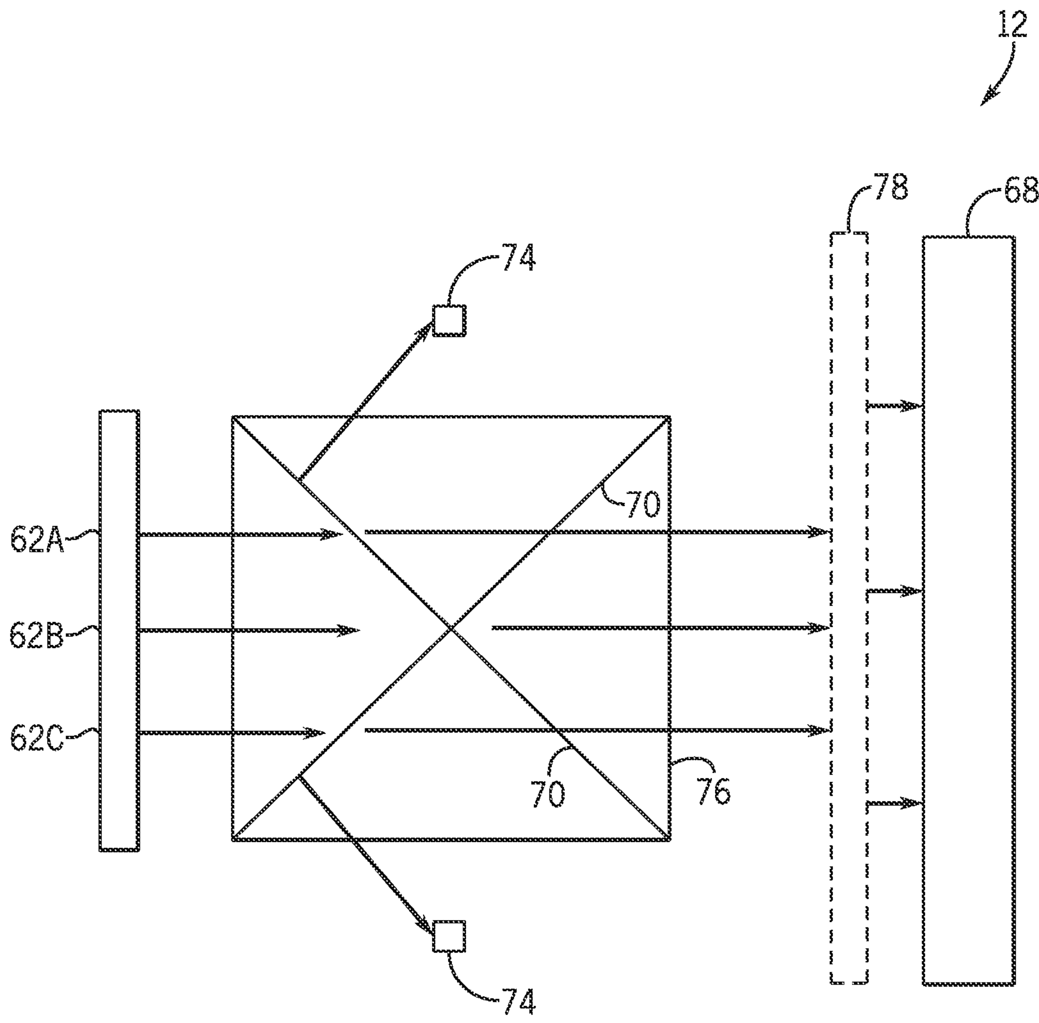
FIG. 8 is a schematic view of an example electronic display, in accordance with an embodiment.

To help illustrate, FIGS. 7 and 8 are schematic views of example electronic displays 12 (e.g., reflective technology displays) having different color component illuminators 62. In some embodiments, the electronic display 12 may include an illuminator layer 64, a reflective layer 66, and a pixel layer 68, as in FIG. 7. For example, the illuminator layer 64 may include different color component illuminators 62 (e.g., a red illuminator 62A, a green illuminator 62B, and a blue illuminator 62C, collectively 62) that generate light in their respective color. The reflective layer 66 may include one or more mirrors 70 (e.g., micromirrors) that reflect the light generated by the illuminators 62 to one or more pixel locations 72 of the pixel layer 68. In some embodiments, each pixel location 72 has a dedicated mirror 70. At each pixel location 72, the light generated by the illuminators 62 may be visible on the electronic display 12 according to the display image data 52. For example, the mirrors 70 may reflect a portion of the generated light to a pixel location 72 for a certain duty cycle to provide a particular luminance level for an image frame. Additionally, in some scenarios, the pixel locations 72 may include active pixels that regulate the amount of light passing therethrough (e.g., based on the display image data 52).

Furthermore, in some embodiments, the mirrors 70 may direct light from the illuminators 62 to either the pixel locations 72 or to one or more light attenuators 74. A light attenuator 74 may include a heat sink and/or a light absorbing surface such as a black mask. If a pixel location 72 is not to receive light (e.g., based on the display image data 52), a mirror 70 may direct the light from the illuminator 62 to a light attenuator 74 instead of the pixel location 72, effectively turning "off" the pixel at the pixel location 72 for that time. For example, an image frame may be divided into multiple sub-frames (e.g., each having a respective bitplane) such that the mirrors 70 alternate between directing the generated light to the pixel location 72 and the light attenuator 74 according to the display image data 52 (e.g., bitplanes). In the aggregate, the amount of time that the pixel location 72 is emitting the generated light is proportional to the desired luminance output at the pixel location 72 (e.g., according to the display image data 52). Moreover, the same mirrors 70 may be used in a time-multiplexed way for different color channels. For example, the red illuminator 62A may be on for a first period, the green illuminator 62B may be on for a second period, and the blue illuminator 62C may be on for a third period, and each mirror 70 may correspond to a pixel location 72 that may display red light during the first period, green light during the second period, and blue light during the third period. In other words, during an image frame, multiple bitplanes for each color component may be implemented such that, in the aggregate (e.g., as temporally averaged by the eye of a viewer), the relative on/off time for each pixel location is indicative of the image.

In some embodiments, the mirrors 70 may be disposed in a mirror array 76, as in FIG. 8. For example, the illuminators 62 may project light to a mirror array 76 having separate mirrors for different pixel locations 72. Moreover, in some embodiments, a light guide 78 may further direct the reflected light from the mirror array 76 to the pixel locations 72 of the pixel layer 68 for viewing. Additionally, the mirror array 76 may direct the generated light to a light attenuator 74 or to the viewed portion of the pixel layer 68 via or sans light guide 78. Although shown as a unidirectional light guide 78, as should be appreciated, the light guide 78 may direct the light from the mirror array 76 in any suitable direction to be viewed at the corresponding pixel locations 72 on the electronic display 12.

The mirror array 76 may be modulated over the course of an image frame such that the light emitted by the illuminators 62 appears as an image corresponding to the display image data 52. For example, independent mirrors 70 of the mirror array 76 may switch between an on-state (e.g., directed toward the pixel locations 72) and an off-state (e.g., directed towards a light attenuator 74) based on the display image data 52. In the on state, the mirrors 70 of the mirror array 76 may direct the light from the illuminators 62 to respective pixel locations 72. In the off state, the mirrors 70 of the mirror array 76 may direct the light elsewhere, such as the light attenuator 74, making the associated pixel location 72 appear dark. In general, the mirrors 70 may be toggled between the on-state and the off-state quickly to create small bursts of light, and the eyes of the viewer may integrate the light to form an image corresponding to the display image data 52.

In general, image frames (e.g., sets of display image data 52) may be sequentially displayed at a refresh rate/frame rate (e.g., 30 Hertz (Hz), 60 Hz, 120 Hz, 240 Hz, or any suitable rate depending on implementation) based on the emission sync signal 56. Each image frame may be the same or different from the previous image frame. For example, different image frames shown in succession may appear as a moving picture or a new scene to a viewer. However, in some scenarios, it may be desirable to display the same image frame repeatedly, such as for static content or content that changes less frequently than the refresh rate. For example, a refresh rate of an electronic display 12 may be 60 Hz, and the content to be displayed may include a clock that moves once every second, changing once every 60 image frames, or moves once per minute, changing once every 3600 image frames.

Figure 9:
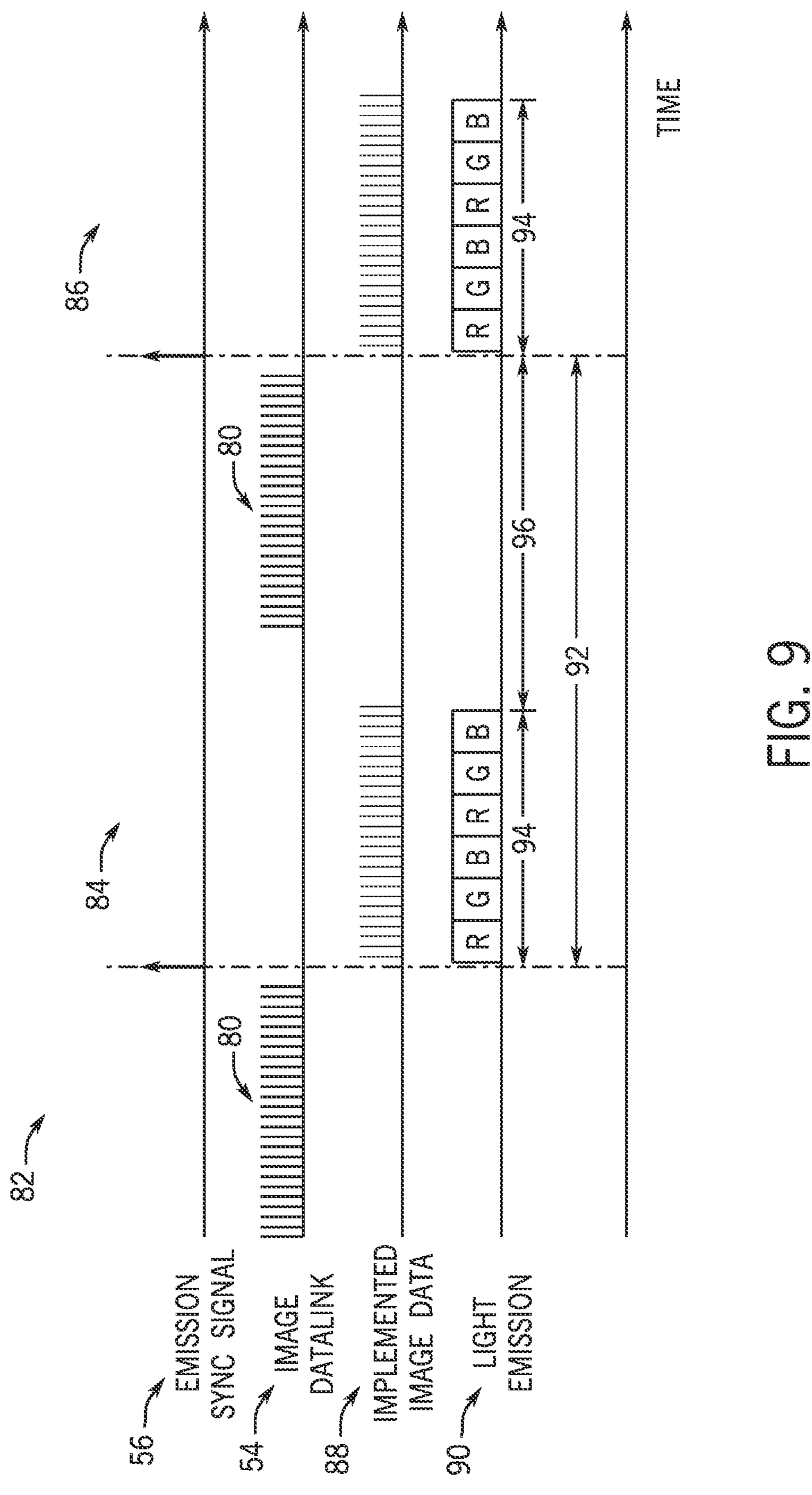
FIG. 9 is an example timing diagram for generating/sending repeated display image data via the image processing circuitry of FIG. 1, in accordance with an embodiment.

In some embodiments, the repeated content may be generated as second, third, and so on sets of transmitted display image data 80, as in the example timing diagram 82 of FIG. 9, for as long as the desired image is static. The transmitted display image data 80 may be sent to the electronic display 12 (e.g., to the frame buffer 60 via the image datalink 54) for the new image frame 84 (i.e., different from the directly previous image frame) and for each repeated image frame 86. Implemented image data 88 (e.g., read from the frame buffer 60 according to (e.g., triggered by) the emission sync signal 56) may set the modulation of light emissions 90. For example, the implemented image data 88 may be a set of bitplanes that set a portion of the mirrors 70 of a reflective technology display to reflect light generated by an illuminator 62 to a respective portion of pixel locations 72, and set other mirrors 70, associated with other pixel locations 72, to reflect the light to the light attenuator(s) 74. As such, the implemented image data 88 may designate certain pixel locations 72 as "on" and other pixel locations as "off" and/or set a brightness thereat. In some embodiments, during an image frame, multiple bitplanes may be used for each color component such that, in the aggregate, the relative on/off time for each pixel location 72 is indicative of the display image data 52 for each color component and, thus, the image.

In some scenarios, the frame length 92 of the image frame may be longer than the emission period 94 of the light emissions 90 of the illuminators 62, leaving off periods 96 between light emissions 90 associated with displaying the image. As used herein, the frame length 92 of the image frame is the time between starts of emission periods 94 associated with separate image frames and includes the off periods 96 after and/or between emission periods 94 of the same image frame. In general, the ratio of the emission period 94 to the frame length 92 may be defined as the emission duty cycle, and the off periods 96 are indicative of moments where no light is desired to be emitted from the pixel locations 72. As should be appreciated, while the illustrated emission periods 94 include back-to-back light emissions 90 of multiple different color components, the light emissions 90 may be separated throughout the image frame such that the image frame includes multiple emission periods 94 with off periods 96 therebetween.

By supplying the transmitted display image data 80 for each repeated image frame 86 and triggering the read of the frame buffer 60 to implement the display image data 52 on the display panel via the emission sync signal 56, timings (e.g., frame scheduling, emission timing, etc.) may be maintained and the desired image may be displayed on the electronic display 12. However, utilizing the image processing circuitry 28 and image datalink 54 may consume additional power and/or other resources (e.g., processing bandwidth) that could otherwise be saved if the image processing circuitry 28 and/or image datalink 54 were disabled or switched to a low power mode.

Figure 10:
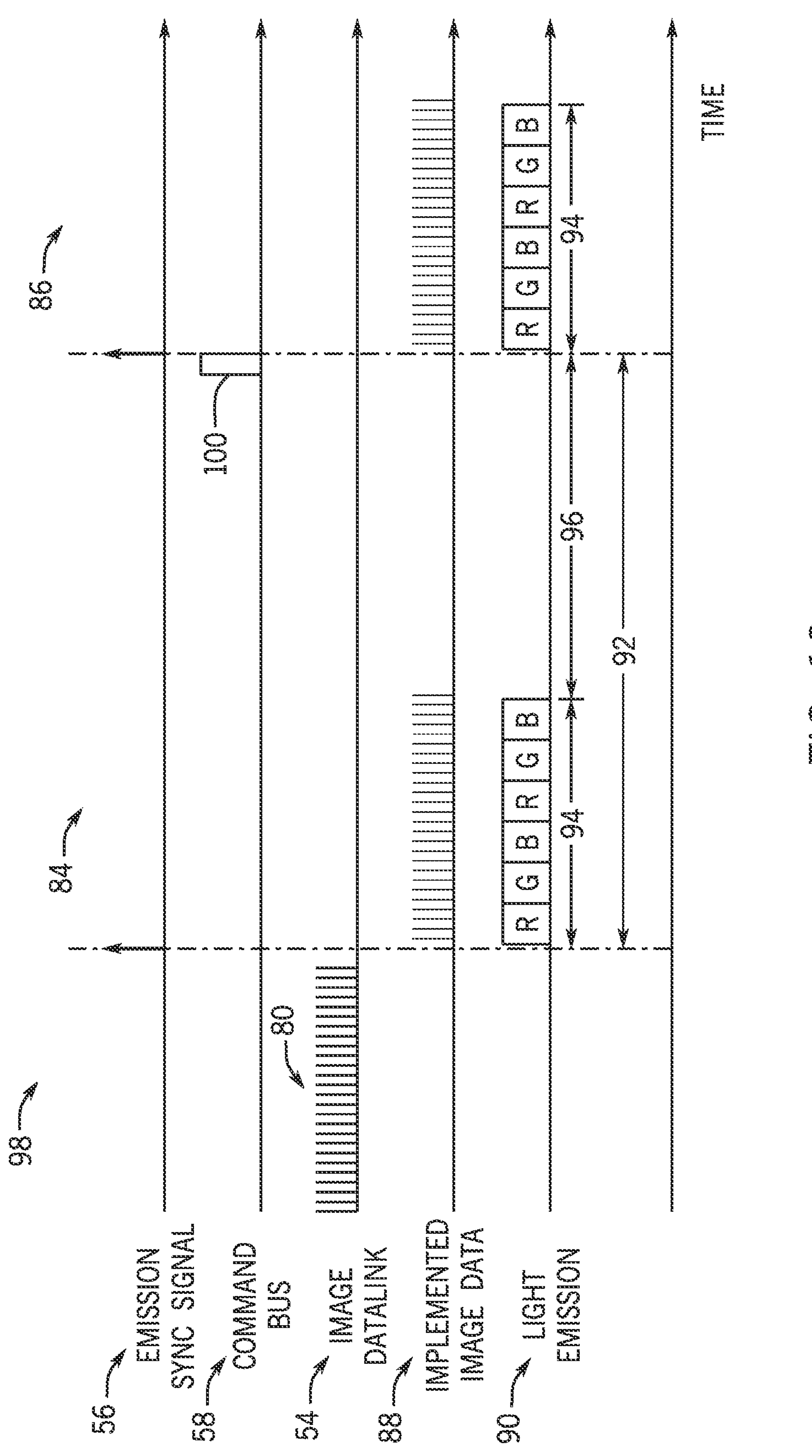
FIG. 10 is an example timing diagram for implementing an auto-refresh command of the electronic display of FIG. 1, in accordance with an embodiment.

As shown in the timing diagram 98 of FIG. 10, an auto-refresh command 100 may be sent to the electronic display 12 (e.g., via the command bus 58) to place the electronic display 12 into an auto-refresh mode that maintains the repeated image frame 86 without receiving the transmitted display image data 80 for each repeated image frame 86. As should be appreciated, the auto-refresh command 100 may be implemented at any point during the off period of the initial image frame (e.g., new image frame 84) that is to be repeated. Additionally, in some embodiments, the emission sync signal 56 may be omitted, as the auto-refresh mode of the electronic display may be exited in response to the emission sync signal 56 in favor of reading the frame buffer 60. However, by stopping or withholding the emission sync signal when implementing the auto-refresh mode (e.g., via the auto-refresh command 100) timings (e.g., frame scheduling, emission timing, etc.) may be disrupted and/or additional circuitry or programming may be utilized to maintain timing for when new image frames 84 are desired. Such additional circuitry or timing disruptions may consume power and/or other resources (e.g., processing bandwidth real estate within the electronic device 10) or cause image artifacts.

Figure 11:
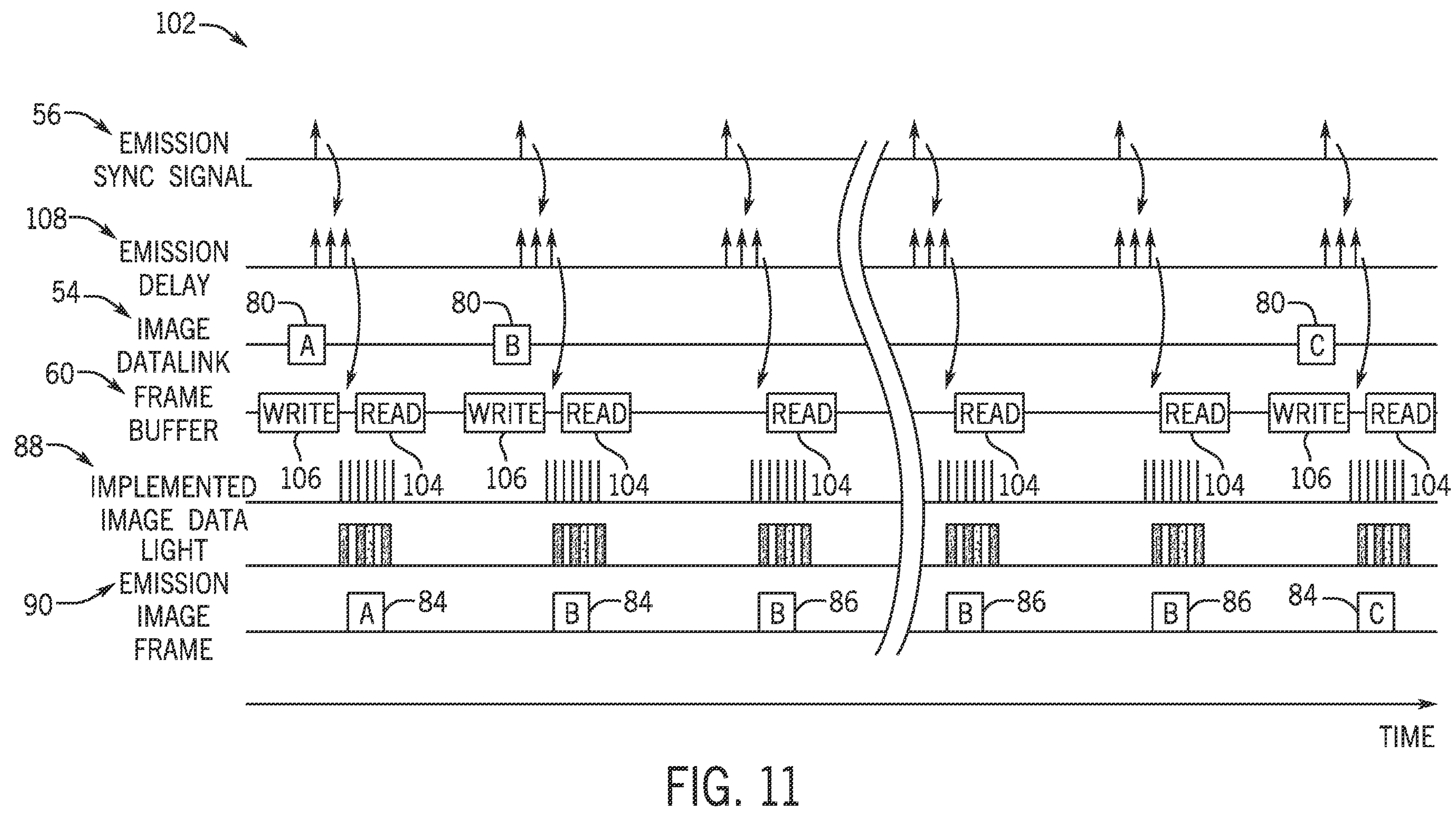
FIG. 11 is an example timing diagram for implementing a frame refresh of the electronic display by rereading the same image data from a frame buffer, in accordance with an embodiment.

As such, it is desirable to implement an efficient refresh of static content that allows the image processing circuitry 28 or a portion thereof to be shut down or placed into a low power mode while maintaining timing (e.g., the emission sync signal 56. As shown in the timing diagram 102 of FIG. 11, the emission sync signal 56 may be supplied to the electronic display 12 to instigate reads 104 of the frame buffer 60 without having updated the display image data 52 (e.g., via a write 106 to the frame buffer 60) sent thereto. For example, when the emission sync signal 56 is received by the electronic display 12, the display controller 37 may instigate a read 104 of the frame buffer 60 (e.g., by the display panel 40) to display the display image data 52 (e.g., set of bitplanes) as if the repeated image frame 86 was a new image frame 84. In effect, the electronic display 12 may be tricked into displaying the same display image data 52 from the frame buffer 60 as if it were transmitted display image data 80 that had just been written.

Additionally, in some embodiments, the reads 104 the frame buffer 60 may be delayed by an emission delay 108, which may be fixed or programmable (e.g., via the controller 42, the display controller 37, and/or the image processing circuitry 28). Indeed, in some embodiments, the emission sync signal 56 may be utilized by multiple components of the electronic device 10 and/or multiple electronic displays 12. For example, in some scenarios, separate electronic displays 12 may be implemented for each eye of a user, and synchronous timing, may be achieved via a common emission sync signal 56 with respective emission delays 108 associated therewith.

Figures 12, 13, 14:
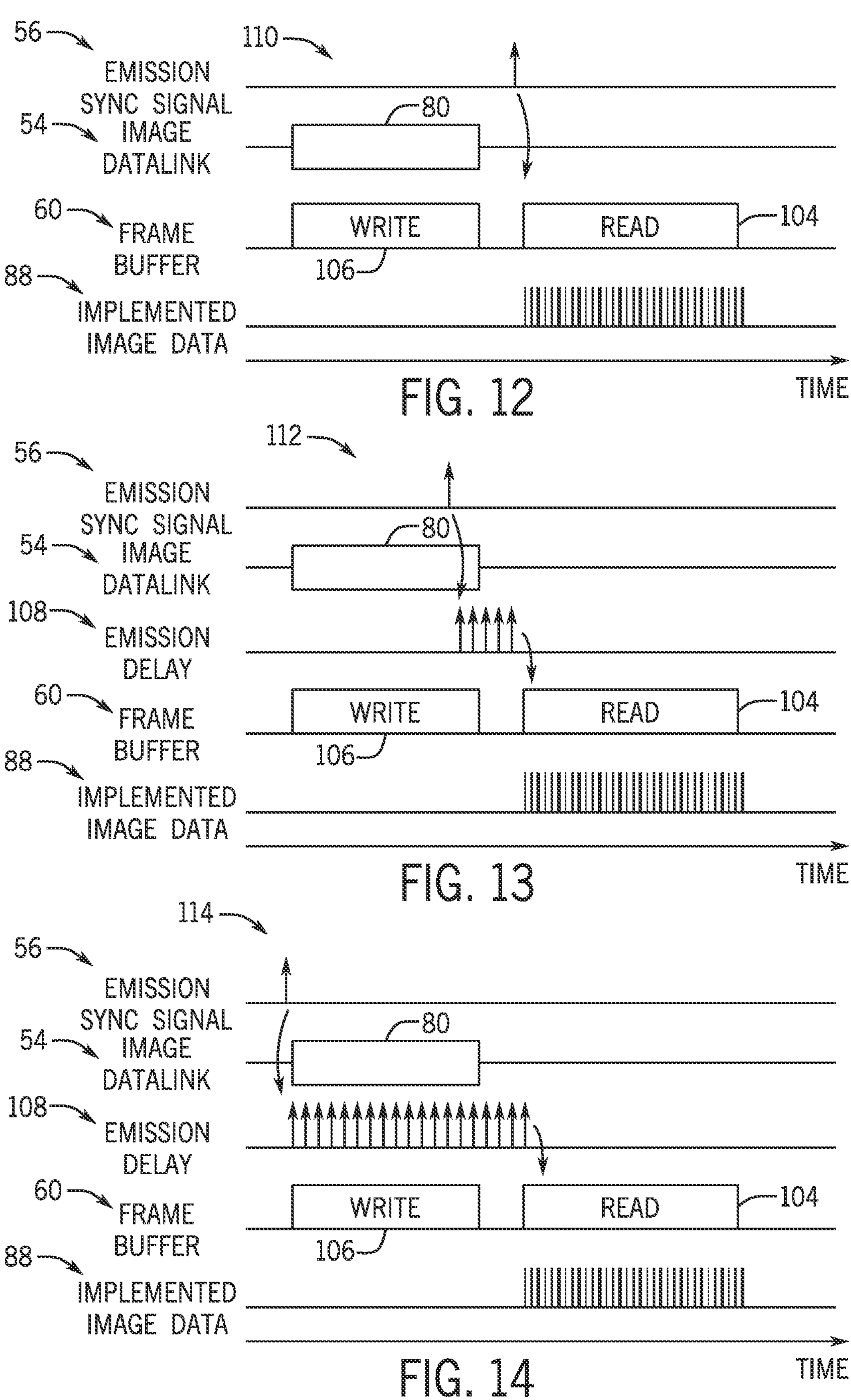
FIG. 12 is an example timing diagrams of writes and reads of transmitted image data without an emission delay, in accordance with an embodiment.
FIG. 13 is an example timing diagrams of writes and reads of transmitted image data with an emission delay, in accordance with an embodiment.
FIG. 14 is an example timing diagrams of writes and reads of transmitted image data with an emission delay, in accordance with an embodiment.

To help illustrate, FIGS. 12 and 13 are example timing diagrams 110, 112 of writes 106 and reads 104 of transmitted image data 80 (e.g., via the image datalink 54) without and with an emission delay 108, respectively. As in the timing diagram 110, the emission sync signal 56 may instigate the read 104 of the frame buffer 60 after the write 106 of the transmitted image data 80 is completed. As discussed above, additional emission sync signals 56 may be utilized to trigger additional reads 104 of the frame buffer 60 without additional writes 106. However, in some scenarios, an emission delay 108 may be utilized to delay the read 104 until after the write 106 is competed, as in the timing diagram 112. For example, as stated above, the emission sync signal 56 may be utilized for multiple components of the electronic device 10 and/or multiple electronic displays 12. As such, the emission sync signal 56 may be maintained at a particular rate and/or timing, and the emission delay 108 (e.g., implemented by the display controller 37 may allow sufficient time for the write 106 to complete before the read 104 of the frame buffer 60. Furthermore, in some embodiments, the emission delay 108 may be utilized even when no writes 106 are being performed, such as for repeated image frames 86.

As discussed above, the emission sync signal 56 may be tied to reads 104 of the frame buffer 60. Additionally or alternatively, the emission sync signal 56 may coincide with writes 106 to the frame buffer 60 (e.g., for new image frames 84), as in the timing diagram 114 of FIG. 14. Moreover, the emission delay 108 may allow sufficient time for a write 106 of the transmitted image data 80 to occur before the read 104. For example, the emission sync signal 56 may trigger the display controller 37 of the electronic display 12 to initiate the emission delay 108 before or during the write 106, and the display controller 37 may instigate the read 104 after the emission delay 108. Moreover, in some embodiments, the emission sync signal 56 may continue to be received (e.g., by the display controller 37) even when no transmitted image data 80 is received and no writes 106 are being performed, such as for repeated image frames 86, and the emission delay 108 may be utilized (e.g., based on the received emission sync signal 56) to delay triggering of the read 104 as if newly transmitted image data 80 were received.

As should be appreciated, the timing complexities of multiple components that utilize the emission sync signal 56 and/or the timing complexities of multiple displays may lead to image artifacts, asynchronous operations of the electronic display(s) 12, if timing is disrupted. As such, by maintaining the emission sync signal 56 and not updating the frame buffer with newly transmitted display image data 80, proper timing (e.g., frame scheduling, emission timing, etc.) may be maintained while the image processing circuitry 28 or a portion thereof may be shut down or maintained in a low power state, thus saving power and/or other resources (e.g., processing bandwidth, real estate on the electronic device 10, etc.).

Figure 15:
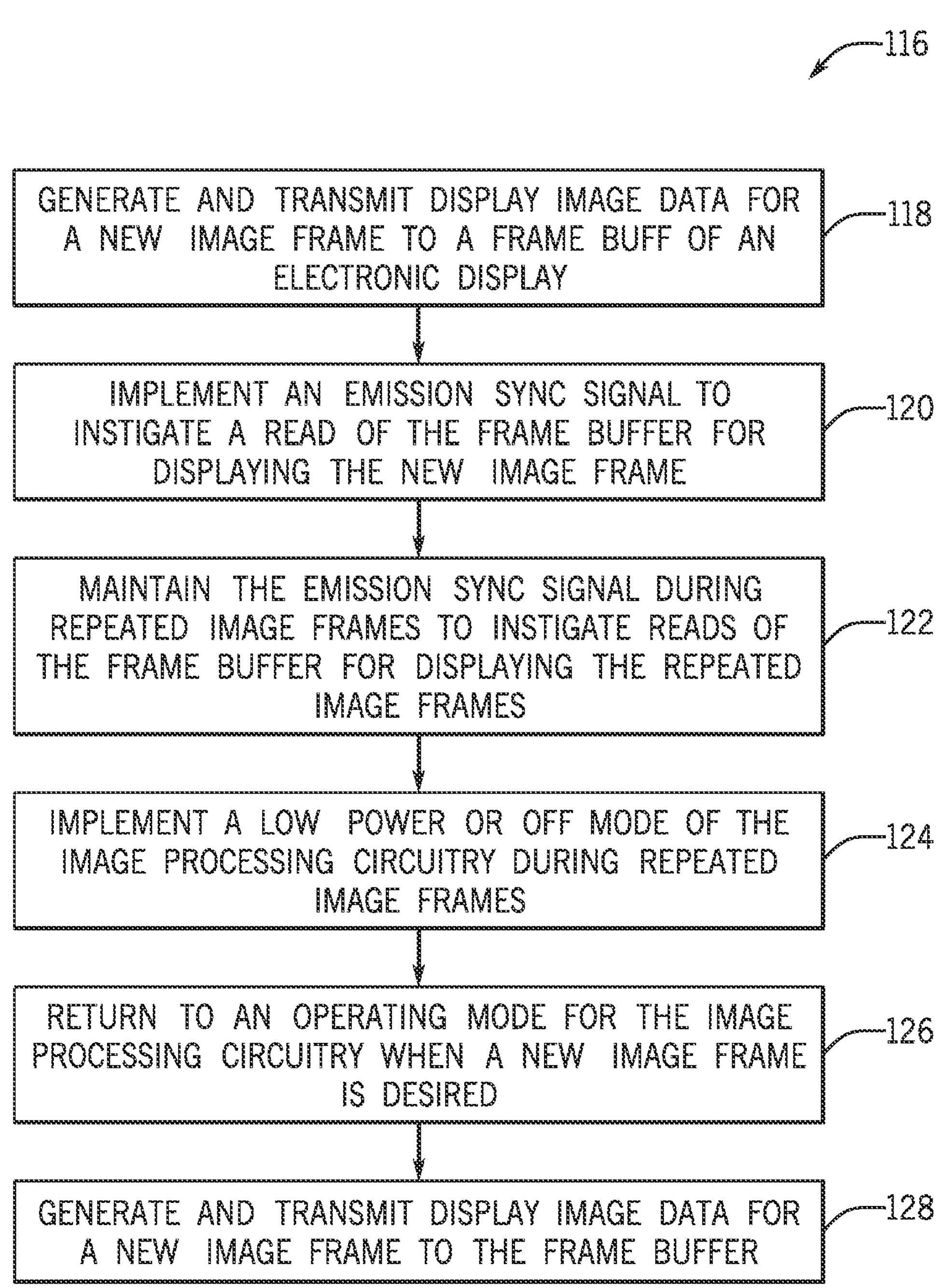
FIG. 15 is a flowchart of an example process for implementing a frame refresh of the electronic display by rereading the same image data from a frame buffer, in accordance with an embodiment.

FIG. 15 is a flowchart 116 of an example process for implementing a frame refresh of the electronic display 12 by rereading the same image data from a frame buffer 60 without sending newly transmitted image data 80 for each repeated image frame 86. In some embodiments, display image data 52 for a new image frame 84 may be generated and transmitted to a frame buffer 60 of an electronic display 12 (process block 118). For example, the transmitted image data 80 may be generated by image processing circuitry 28 and sent via an image datalink 54 to be written to the frame buffer 60. Additionally, an emission sync signal 56 may be implemented to instigate a read 104 of the frame buffer 60 (e.g., by the display panel 40 and/or display controller 37) for displaying the new image frame 84 (process block 120). The emission sync signal 56 may be maintained during repeated image frames 86 to instigate reads 104 of the frame buffer 60 for displaying the repeated image frames (process block 122). Moreover, the repeated image frames 86 may be displayed without receiving transmitted display image data 80 for the repeated image frames 86. During the repeated image frames 86, the image processing circuitry 28, or a portion thereof, may be implemented in a low power or off mode (process block 124), thus, saving power. When a new image frame 84 is desired, the image processing circuitry 28 may return to a normal operating mode (process block 126), and display image data 52 for the new image frame 84 may be generated (e.g., via the image processing circuitry 28) and transmitted (e.g., via the image datalink 54) to the frame buffer 60 (process block 128).

The specific embodiments described above have been shown by way of example, and it should be understood that these embodiments may be susceptible to various modifications and alternative forms. Moreover, although the above referenced flowchart 116 is shown in a given order, in certain embodiments, process/decision blocks may be reordered, altered, deleted, and/or occur simultaneously. Additionally, the referenced flowchart 116 is given as an illustrative tool and further decision and process blocks may also be added depending on implementation. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

image processing circuitry configured to generate image data corresponding to an image to be displayed during a first image frame and a second image frame subsequent the first image frame, wherein the image data is not regenerated for the second image frame; and an electronic display comprising:

a frame buffer configured to:

receive the image data via an image datalink in a higher power mode, wherein the image datalink is coupled between the image processing circuitry and the electronic display; and store the image data from the image processing circuitry; and a display panel configured to:

receive, via a command bus while the image datalink is in a lower power mode, a first emission sync signal;

display the image during the first image frame based on a first read of the image data from the frame buffer in response to the first emission sync signal;

receive, via the command bus while the image datalink is in the lower power mode, a second emission sync signal; and display the image during the second image frame based on a second read of the image data from the frame buffer in response to the second emission sync signal, wherein the image to be displayed over an entire display panel during the first image frame is the same as the image to be displayed over the entire display panel during the second image frame, and wherein the first emission sync signal and the second emission sync signal are supplied to the command bus by a controller of the image processing circuitry exterior to the electronic display.

2. The electronic device of claim 1, wherein the image data corresponding to the image is sent to the frame buffer only once for being displayed during both the first image frame and the second image frame.

3. The electronic device of claim 1, wherein at least a portion of the image processing circuitry is configured to enter a lower power mode after generating the image data and maintain the low power mode during the second image frame.

4. The electronic device of claim 1, comprising a display controller configured to receive the first emission sync signal and direct the display panel to display the image during the first image frame in response to the first emission sync signal.

5. The electronic device of claim 4, wherein the display controller is configured to delay directing the display panel to display the image by an emission delay.

6. The electronic device of claim 1, wherein the image data comprises a set of bitplanes, wherein displaying the image during the first image frame comprises controlling light emissions at a plurality of pixel locations for a plurality of subframes of the first image frame, and wherein each of the plurality of subframes corresponds to a respective bitplane of the set of bitplanes.

7. The electronic device of claim 1, wherein the display panel comprises a reflective technology display panel.

8. The electronic device of claim 7, wherein the reflective technology display panel comprises:

an illuminator configured to generate light; and a plurality of mirrors configured to selectively control emissions of the light at a respective plurality of pixel locations.

9. The electronic device of claim 1, wherein the command bus is separate from the image datalink.

10. The electronic device of claim 1, wherein the command bus is a lower speed datalink than the image datalink.

11. A method comprising:

generating, via image processing circuitry, image data corresponding to an image to be displayed during a first image frame and a second image frame subsequent the first image frame, wherein the image data is generated prior to the first image frame and is not generated again for the second image frame;

transmitting the image data to a frame buffer of an electronic display via an image datalink in a higher power mode, wherein the image datalink is coupled between the image processing circuitry and the electronic display;

displaying, via a display panel of the electronic display, the image during the first image frame based on a first read of the image data from the frame buffer in response to a first emission sync signal; and displaying the image during the second image frame based on a second read of the image data from the frame buffer in response to a second emission sync signal, wherein the image to be displayed over an entire display panel during the first image frame is the same as the image to be displayed over the entire display panel during the second image frame, and wherein the first emission sync signal and the second emission sync signal are supplied via a command bus by a controller of the image processing circuitry exterior to the electronic display.

12. The method of claim 11, comprising supplying, via the controller, the first emission sync signal and the second emission sync signal with a maintained timing.

13. The method of claim 11, comprising engaging or maintaining a low power mode of the image processing circuitry during the second image frame.

14. The method of claim 11, wherein the image data is transmitted to the frame buffer a first time before the first image frame and is not transmitted a second time between the first time and the second image frame.

15. The method of claim 11, wherein the image data is transmitted via the image datalink coupled between the image processing circuitry and the electronic display, and wherein the electronic display is configured to receive the first emission sync signal and the second emission sync signal via the command bus.

16. The method of claim 15, wherein the command bus comprises a lower speed datalink than the image datalink.

17. An electronic display comprising:

a frame buffer configured to receive, via an image datalink in a higher power mode that is coupled between image processing circuitry and the electronic display, image data corresponding to a single image to be displayed during a plurality of image frames from image processing circuitry, wherein the image data is received by the frame buffer only once for the plurality of image frames; and a display panel configured to, in response to each emission sync signal of a plurality of emission sync signals corresponding to the plurality of image frames, read the image data in the frame buffer and display the single image, wherein the single image to be displayed over an entire display panel is the same during the plurality of image frames, and wherein the plurality of emission sync signals is supplied via a command bus by a controller of the image processing circuitry exterior to the electronic display while the image datalink is in a lower power mode.

18. The electronic display of claim 17, comprising a display controller configured to receive, via the command bus, the plurality of emission sync signals and trigger the display panel to read the frame buffer and display the single image in response to each emission sync signal of the plurality of emission sync signals.

19. The electronic display of claim 18, wherein the display controller is configured to delay triggering the display panel to read the frame buffer by an emission delay following each emission sync signal of the plurality of emission sync signals.

20. The electronic display of claim 17, wherein the display panel comprises:

an illuminator configured to generate light; and a plurality of mirrors configured to selectively control light emissions of the light at a respective plurality of pixel locations according to the image data, wherein the image data comprises a set of bitplanes, wherein displaying the single image during an image frame of the plurality of image frames comprises controlling the light emissions at the respective plurality of pixel locations for a plurality of subframes of the image frame, and wherein each of the plurality of subframes corresponds to a respective bitplane of the set of bitplanes.

* * * * *